INVENTOR.
THOMAS F. SARAH

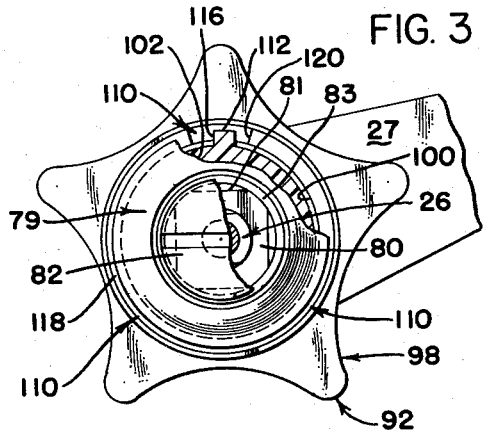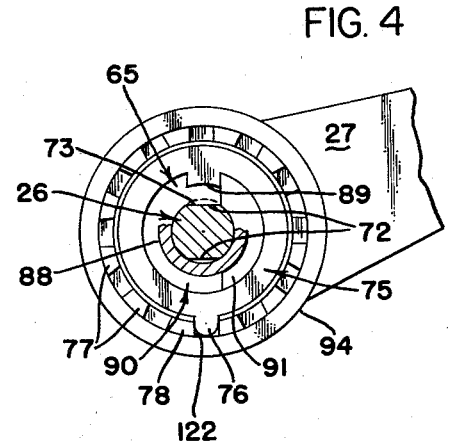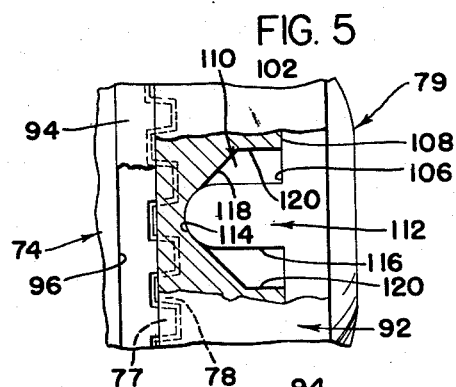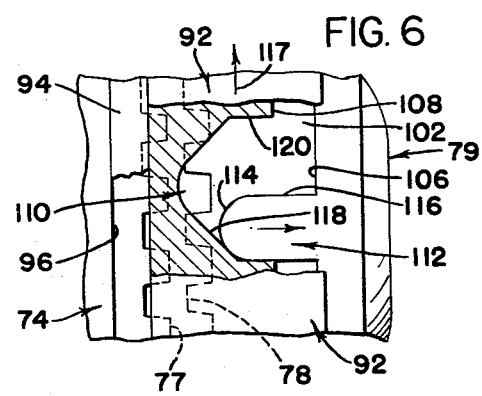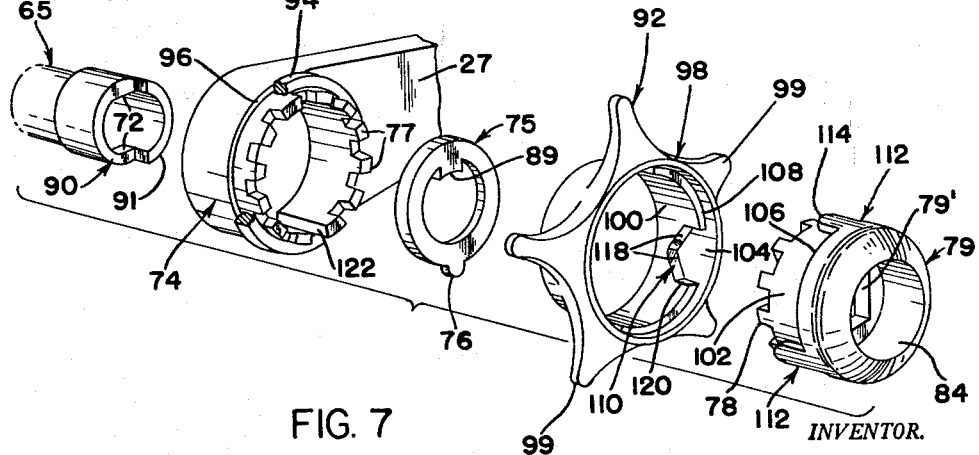

United States Patent Office 3,097,814
Patented July 16, 1963

3,097,814
DRAG ADJUSTMENT FOR SPINNING REEL
Thomas F. Sarah, Akron, Ohio, assignor to The Enterprise Manufacturing Company, Akron, Ohio, a corporation of Ohio
Filed May 11, 1961, Ser. No. 109,448
8 Claims. (Cl. 242—84.54)

The invention relates generally to drag or brake mechanisms for spinning reels, and more particularly to improved independent adjusting means for setting the initial drag tension. This application is a continuation-in-part of my copending application Serial No. 859,655, filed December 15, 1959.

The purpose of a drag or brake in a fishing reel is to allow the line to pay out when the pull exerted by the fish overcomes the frictional resistance of the drag. A conventional drag mechanism comprises friction disks interposed between the crank handle and the drive gear in such manner that a friction drive is provided for retrieving the line. The amount of friction or drag is adjusted by turning an adjusting nut or starwheel on the exterior of the reel, so that the fisherman can play the fish by allowing it to run, and so that the line does not break when the pull of the fish exceeds the test strength of the line.

In my copending application Serial No. 859,655 I disclosed and claimed a crank-operated mechanism for varying the amount of drag by which the fisherman does not have to let go of the crank handle and momentarily lose control of the fish he is playing when he repeatedly decreases the amount of drag to let the fish run and alternately increases the amount of drag to enable retrieving the line. However, in order to adjust the initial tension on the drag, it was necessary to pull outwardly on a spring-urged adjustment turn button to disengage it from the crank handle and to turn the button while holding it in disengaged position.

I have now discovered a means to facilitate the initial drag adjustment by eliminating the necessity of pulling outwardly on the adjustment turn button against the effect of a spring, which urges it into engagement with the crank handle, before being able to turn the button for adjustment.

It is an object of the present invention to provide improved means for automatically disengaging the adjustment turn button from the crank handle and independently adjusting the initial amount of drag.

The foregoing objective is accomplished in a simple and inexpensive construction having a minimum number of parts and easily adaptable to conventional spinning reels. A preferred embodiment of the improved construction is shown by way of example in the accompanying drawings and described in detail herein. Obviously, the construction shown may be varied in different respects without departing from the scope of the invention defined in the claims.

Referring to the drawings:

FIG. 3 is an end elevation taken along line 3—3 of FIG. 2 with parts broken away.

FIG. 4 is a section taken on line 4—4 of FIG. 2.

FIG. 5 is an enlarged fragmentary plan view with parts broken away taken approximately on line 5—5 of FIG. 2.

FIG. 6 is a view similar to FIG. 5 showing the adjustment button in disengaged position.

FIG. 7 is an exploded perspective view of the adjustment button and associated parts.

Figure 1:
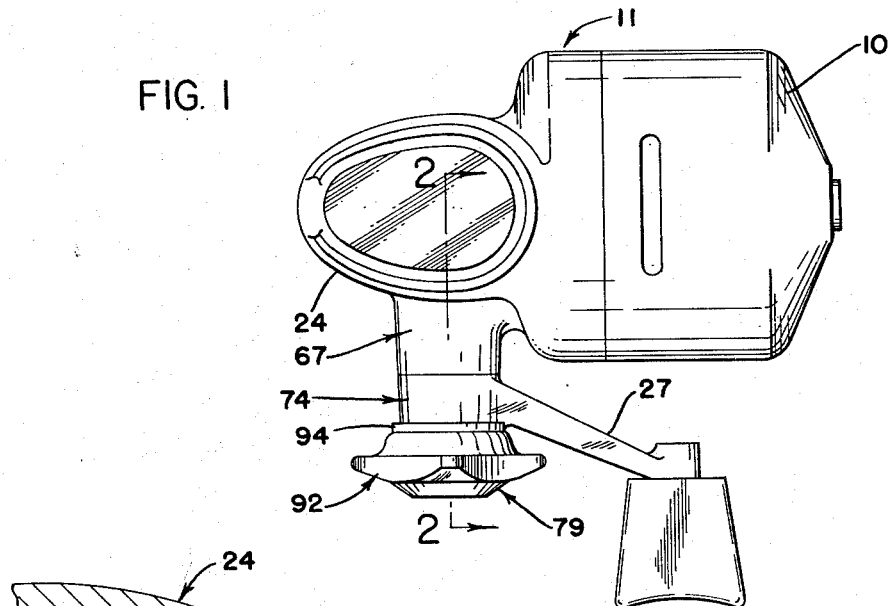
FIG. 1 is an elevation of a closed face spinning reel embodying the improved independent drag adjustment means.

The reel shown in FIG. 1, preferably has a closed face or cap 10 fitting onto the front open end of a housing 11. At the other end of the housing is a gear compartment 24.

Figure 2:
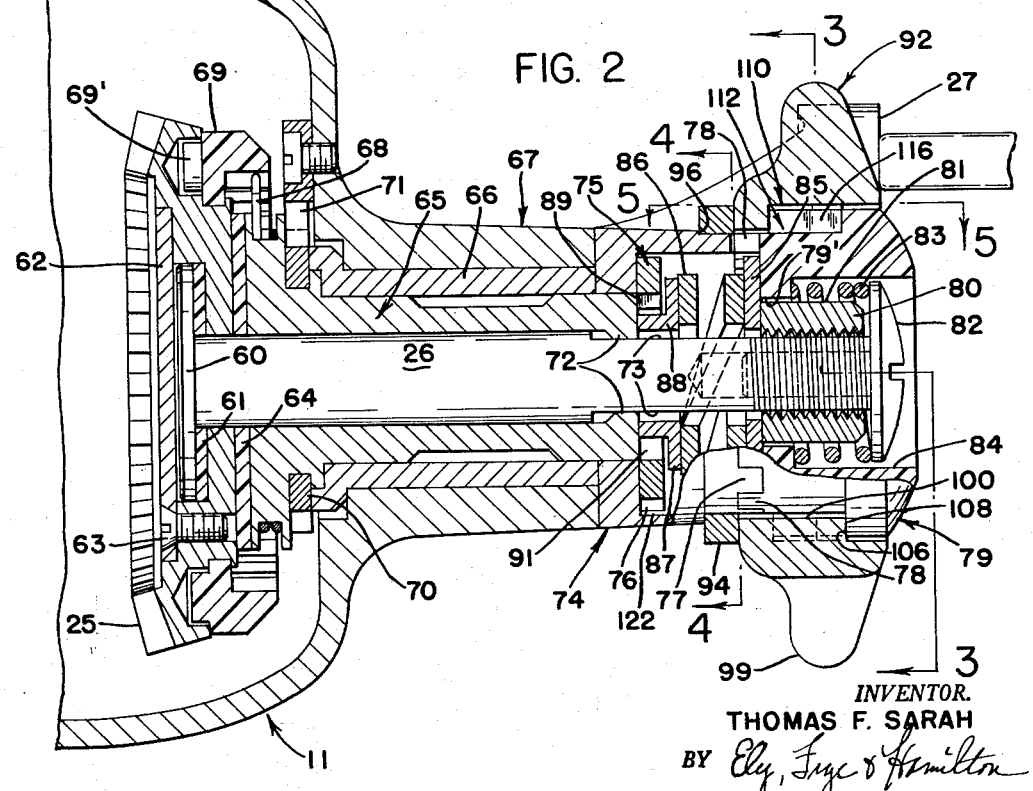
FIG. 2 is an enlarged sectional view on line 2—2 of FIG. 1 with parts broken away.

In FIG. 2, a bevel gear 25 is shown mounted on a shaft 26 for rotation by the crank handle 27. The bevel gear serves to drive a shaft spool flyer and other related mechanism which are shown and described in my copending application Serial No. 859,655, now Patent No. 3,025,020.

The gear 25 has a recess in which a circular flange 60 at the inner end of a shaft 26 fits. Between the flange 60 and the base of the recess is a friction brake disk 61 journaled on shaft 26, and a plate 62 is secured to the inner face of the gear by screws 63 and overlies the flange 60.

The outer face of the gear is abutted by a second friction brake disk 64 journaled on shaft 26. The brake disks 61 and 64 may be of nylon or other suitable material. Disk 64 abuts the inner end of a drive sleeve 65 journaled in a bushing 66 in the housing neck 67. A click spring 68, which is shown in more detail in FIG. 6 of my copending application, is located in an annular groove around the inner end of sleeve 65 and has its inner end anchored to the sleeve and its outer end engaging the toothed inner annular surface of a ratchet wheel 69 keyed to the gear by lugs 69'. Thus, when the gear 25 turns relative to the sleeve 65, the click of the spring ratcheting over the teeth of the ratchet wheel 69 warns the fisherman.

An anti-reverse ratchet wheel 70 is secured on sleeve 65, and an anti-reverse pawl 71 movably mounted on the housing 24 engages the wheel 70 to permit rotation of the sleeve 65 in line-retrieving direction and to prevent reverse rotation thereof.

At its outer end the sleeve 65 is splined to shaft 26 by means of inturned lugs 72 on the sleeve slidably fitting flatted portions 73 on the shaft, so that the shaft 26 rotates with sleeve 65 but is axially slidable therein. The hub 74 of crank handle 27 is rotatable on the outer end of sleeve 65 and has an outer annular flange in which a washer 75 is keyed at 76. The outer end of hub 74 is provided with teeth 77 meshing with teeth 78 on the inner end of an adjusting turn button 79.

The button 79 is splined on an inner nut 80 by means of a flatted hole 79' in the button fitting diametrically opposite flats 81 on nut 80. The nut is screwed on the outer end of shaft 26, and the shaft has a threaded bore into which a screw 82 is threaded for retaining a spring 83 surrounding the nut 80 and abutting the base of a recess 84 in the turn button to hold the button against the hub 74.

The inner end of nut 80 abuts a spring washer 85 which is dished to take up play, and the washer abuts the outer end of a stiff helical brake spring 86, the inner end of which abuts a flanged spacer washer 87 having an inner sleeve portion 88 abutting the outer end of sleeve 65. The sleeve portion 88 has sufficient axial length to allow axial adjustment of sleeve 65 without binding crank hub 74. The washer 75, which is keyed at its outer periphery to hub 74, has a lug 89 on its inner periphery rotatable in a substantially semi-circular slot 90 in the end of sleeve 65 when the handle 27 is turned. The slot 90 forms a circumferential shoulder 91 in the end of shaft 65 forming a stop for the lug, and the lug 89 and shoulder 91 constitute interengaging lost-motion drive means permitting a partial turn of the crank handle relative to the sleeve when the sleeve is held against rotation.

The parts described thus far merely provide an exemplary vehicle for my improved adjusting means which will now be described.

According to the present invention, a starwheel 92 is interposed between the adjusting turn button 79 and the spring 83 on the one hand, and the crank handle 27 and a washer 94 on the other hand. The washer 94 abuts the annular shoulder 96 of the crank handle to provide a free rotative fit between the crank handle and the starwheel.

The starwheel 92 is provided with arcuate recesses 98 forming points 99 to permit the fisherman to grasp it readily with his fingers for operation; a recessed interior having an inner annular wall 100 which rotatively fits about the sleeve portion 102 of the turn button 79; and an annular recess 104 which has a greater diameter than the inner wall 100 to receive the flange portion 106 of the turn button for abutment against the edge surface 108 of the inner wall. The inner wall is provided with a plurality of camming cavities or notches 110. Although the preferred embodiment is intended for three such cavities or notches arranged at eight o'clock, twelve o'clock and four o'clock, respectively, as seen in FIG. 3, obviously the position and number thereof are a matter of choice and applicant does not consider himself to be limited thereby.

The sleeve portion 102 of the adjusting turn button 79 is interrupted by a corresponding number and position of cam follower means or driving lugs 112 extending from flange portion 106 and each having a cam follower portion 114 and driving surfaces 116. Each lug 112 is received in one of the cavities.

The following description of the operation of the improved adjusting means will best describe the function of the cam cavities or notches 110 and the cam follower means 112:

The spring 83, under the head of the screw 82 resiliently holds the teeth 78 on the inner end of the adjusting turn button 79 in normal meshing engagement with the teeth 77 on the outer end of hub 74 of the crank handle 27. When the starwheel 92 is manually rotated in the direction of the arrow 117 in FIG. 6, the cam surfaces 118 of the cam cavity 110 urge the cam follower means or driving lugs 112 from the position shown in FIG. 5 to the position shown in FIG. 6 at which position the turn button is automatically lifted out of tooth-meshing engagement with the crank handle. The driving surface 116 of the cam follower means, as shown in FIG. 6, is now in abutting engagement with a driving wall 120 of the cam cavity. A continued rotation of the starwheel 92 rotates the adjustment turn button with respect to the crank handle. Depending on the direction of rotation, the button is either turned to tighten or loosen nut 80 on the threads of shaft 26 to adjust the initial tension as desired on the brake disks 61 and 64, the thrust of nut 80 being transmitted through spring 86 and washer 88 to sleeve 65. When the starwheel is released the spring 83 returns the turn button to mesh the teeth 77 and 78.

As may be seen in FIGS. 4 and 7, a groove 122 is provided in the handle 27 for permitting the key 76 of washer 75 to pass therethrough for assembly and disassembly purposes.

In the general operation of the reel, after the initial tension on the drag has been adjusted, when a cast is made and a fish is hooked, the fisherman starts retrieving the line by turning the crank handle forwardly. At any time, the fisherman may decrease the amount of drag to allow the fish to run merely by giving the crank handle a partial reverse turn.

As the crank handle is turned in reverse, the anti-reverse ratchet 70 and pawl 71 will prevent turning of sleeve 65 and shaft 26, and the crank handle will turn the adjusting turn button 79 and loosen the nut 80 on the threads of shaft 26, decreasing the thrust on sleeve 65 and brake disks 61 and 64 to allow easier relative turning of gear 25 and the related elements which are more fully described in my copending application. The amount the drag can be decreased is predetermined by the travel of lug 89 of washer 75 in circular slot 90 of sleeve 65, which is approximately 180° from one end of the shoulder 91 to the other, because the sleeve is held from turning in reverse by the anti-reverse ratchet mechanism.

Forward turning of the crank through about one-half turn will return the lug to the other end of the slot 90 and increase the thrust on the brake disks to allow retrieving of the line as desired, and the fisherman may repeatedly decrease and again increase the drag in this manner to play the fish as he desires. If the pull on the line is decreased after a reverse half turn, as by the fish becoming unhooked, the line may be wound on the spool with the decreased drag until sufficient pull is again exerted to hold the winding mechanism while the crank handle turns to tighten the adjusting nut 80.

It will be seen that the present invention provides a relatively simple construction to enable the fisherman merely by turning the starwheel to disengage automatically the turn button from the crank handle for adjusting the initial drag tension. The combination of the sleeve portion of the starwheel and the washer 94 surrounds and protects the teeth 77 and 78 from dirt getting into and between the teeth and preventing meshing engagement.

What is claimed is:

1. In a spinning reel having a drag mechanism, a crank handle operatively associated therewith and a turn button, spring means normally urging said turn button into non-rotatable engagement with said crank handle, said turn button adapted when disengaged to adjust the tension on said drag mechanism, means interposed between said turn button and said crank handle and manually operable to disengage said turn button from and to rotate it with respect to said crank handle for adjusting the initial tension on said drag mechanism.

2. In a spinning reel having a drag mechanism, a crank handle operatively associated therewith and a turn button, spring means normally urging said turn button into non-rotatable engagement with said crank handle, said turn button being adapted when disengaged to adjust the tension on said drag mechanism, adjustment means interposed between said turn button and said crank handle, cooperating means on said adjustment means and said turn button and operable to disengage said turn button from and to rotate it with respect to said crank handle for adjusting the initial tension on said drag mechanism.

3. In a spinning reel having a drag mechanism, a crank handle operatively associated therewith and a turn button, spring means normally urging said turn button into non-rotatable engagement with said crank handle, said turn button being adapted when disengaged to adjust the tension on said drag mechanism, rotatable means interposed between said turn button and said crank handle, cooperating cam and drive means on said rotatable means and said turn button operable to respectively disengage said turn button from said crank handle and to rotate said turn button relative to said crank handle to adjust the initial tension on said drag mechanism.

4. In a spinning reel having a drag mechanism, a crank handle operatively associated therewith and a turn button, spring means normally urging said turn button into non-rotatable engagement with said crank handle, said turn button adapted when disengaged and rotated with respect to said crank handle to adjust the tension on said drag mechanism, an improved adjustment for said drag mechanism comprising, means interposed between said turn button and said crank handle and having a cam notch, said turn button having a cam follower engageable with said cam notch, said interposed means being manually rotatable to disengage said spring-urged turn button from and to rotate it with respect to said crank handle and thereby adjust the initial tension on said drag mechanism.

5. In a spinning reel having a drag mechanism, a crank handle operatively associated therewith and a turn button, spring means normally urging said turn button into non-rotatable engagement with said crank handle, said turn button adapted when disengaged and rotated with respect to said crank handle to adjust the tension on said drag mechanism, improved adjustment means for said drag mechanism comprising a starwheel interposed between said turn button and said crank handle and having an interior cam cavity, said turn button having cam follower means engageable with said cam cavity, said starwheel being manually rotatable to disengage said spring-urged turn button from and to rotate it with respect to said crank handle and thereby adjust the initial tension on said drag mechanism.

6. In a spinning reel having a drag mechanism, a crank handle operatively associated therewith and a turn button non-rotatably engageable with said crank handle, spring means normally urging said turn button into engagement with said crank handle, said turn button adapted when disengaged and rotated with respect to said crank handle to adjust the tension on said drag mechanism, improved adjustment means for said drag mechanism comprising, a starwheel interposed between said turn button and said crank handle and having an interior cam cavity with drive walls, said turn button having cam follower means and drive surfaces engageable respectively with said cam cavity and said drive walls, said starwheel being manually rotatable to disengage said spring-urged turn button from and to rotate it with respect to said crank handle and thereby adjust the initial tension on said drag mechanism.

7. In a spinning reel having a drive gear, a friction brake disk abutting the gear face, crank-operated mechanism for varying the braking pressure applied to said disk, said mechanism having a shaft extending from said gear, a drive sleeve splined to said shaft for applying axial thrust to said disk, an adjusting nut threaded on said shaft for exerting axial thrust against said drive sleeve, a crank handle journaled on said sleeve, a turn button splined to said nut and non-rotatably engageable with said handle, spring means normally holding said button in driving engagement with said handle, and interengaging lost-motion drive means between said handle and sleeve for permitting a partial rotation of said handle relative to said sleeve to adjust the axial thrust on said sleeve, the improvement comprising a starwheel interposed between said crank handle and said turn button, said starwheel having an inner wall with at least one cam cavity therein and driving walls adjoining said cam cavity, said turn button having at least one lug on its outer periphery, said lug having a cam follower portion for nesting in said cam cavity and driving surfaces adapted for engagement with said driving walls, said starwheel upon manual rotation being adapted to cam said turn button out of engagement with said crank handle and rotate it for setting the initial braking pressure against said friction brake disk.

8. In a reel having a turn button adapted to adjust the tension on a drag mechanism and a crank handle which is non-rotatably engageable with said turn button, a starwheel interposed between said crank handle and said turn button, said starwheel having an inner wall with at least one cam cavity therein and driving walls adjoining said cam cavity, said turn button having at least one lug on its outer periphery, said lug having a cam follower portion for nesting in said cam cavity and driving surfaces adapted for engagement with said driving walls, said starwheel upon manual rotation being adapted to cam said turn button out of engagement with said crank handle and rotate it for setting the initial tension on said drag mechanism.

References Cited in the file of this patent

UNITED STATES PATENTS

| | | |
|---|---|---|
| 1,058,043 | Dunn | Apr. 8, 1913 |
| 1,714,286 | Waldo | May 21, 1929 |
| 2,925,964 | Holahan | Feb. 23, 1960 |